United States Patent [19]

Hobbins et al.

[11] Patent Number: 4,701,801

[45] Date of Patent: Oct. 20, 1987

[54] CONDUCTIVE SCREEN FOR VIDEO DISPLAY UNIT

[75] Inventors: Martin E. Hobbins, Richmond Hill; Robert G. Dickie, New Market; Rene Pardo, Toronto, all of Canada

[73] Assignee: Northern Technologies Ltd., Markham, Canada

[21] Appl. No.: 904,165

[22] Filed: Sep. 5, 1986

Related U.S. Application Data

[63] Continuation-in-part of Ser. No. 840,393, Mar. 17, 1986.

[51] Int. Cl.[4] .............................................. H04M 5/65

[52] U.S. Cl. .................................. 353/245; 174/35 R

[58] Field of Search ........................ 358/245, 253, 255; 174/35 MS, 35 R; 219/10.55 D

[56] References Cited

U.S. PATENT DOCUMENTS

| | | | |
|---|---|---|---|
| 4,246,613 | 1/1981 | Choder et al. | 358/245 |
| 4,381,421 | 4/1983 | Coats et al. | 358/245 |
| 4,412,255 | 10/1983 | Kuhlman et al. | 358/245 |
| 4,468,702 | 8/1984 | Jandrell | 358/245 |
| 4,514,585 | 4/1985 | Paymtom | 358/245 |

*Primary Examiner*—Edward L. Coles, Sr.
*Attorney, Agent, or Firm*—Woodcock Washburn Kurtz Mackiewicz & Norris

[57] ABSTRACT

Disclosed is a conductive screen for a video display unit. In particular, this invention discloses an electromagnetic interference ("EMI") shielding device for a video display unit and methods for making the same. This invention relates to an EMI shielding device in which an electrically conductive screen or conductive coating is used to shield the face plate of a cathode ray tube. The face plate is maintained in place by holding means located between the face plate and the bezel.

5 Claims, 4 Drawing Figures

CONDUCTIVE SCREEN FOR VIDEO DISPLAY UNIT

CROSS REFERENCE

This application is a continuation-in-part of copending application Ser. No. 840,393, filed Mar. 17, 1986.

BACKGROUND OF THE INVENTION

This invention relates to an electromagnetic interference ("EMI") shielding device for a video display unit ("VDU") and methods for making the same. More particularly, this invention relates to an EMI shielding device in which an electrically conductive transparent screen or a transparent conductive coating is applied to the face plate of the cathode ray tube (CRT).

It is well ,known that operation of a cathode ray tube results in a build up of static electricity on the face or display portion of the cathode ray tube. This build up of static electricity causes a disadvantageous accumulation of foreign particles on the face plate of the video display unit as well as the VDU operator. In addition, it is advantageous to provide an antiglare treatment for the viewing surface of VDU displays. Antiglare treatments are typically accomplished by causing the outermost viewing surface to have a slight texture (non flat) surface. In many applications, this antiglare feature is achieved by mechanically or chemically etching a textured surface into the viewing face of the cathode ray tube itself. This process may be relatively expensive. In other antiglare applications, a texture is imparted to a face plate of rolled plastic which may be sold separate from the VDU as a feature added by the user.

It has recently become known that EMI shielding may be provided by knitted or woven wire mesh which is fully laminated between glass and/or plastic substrates. For example, see the brochure by Chomerics entitled "Chomerics Optical Products", date unknown. While this may be effective means for reducing EMI and the build up of static electricity on the face of a video display unit, shielding of this type is typically for military/aerospace application and it requires relatively complex manufacturing procedures.

The manner in which an EMI shielded face plate is mounted to the bezel of the CRT housing is important for many reasons, including grounding efficiency, mechanical stability, and simplicity of construction. In particular, it is known that the edge of a shielded face plate may be surrounded by a conductive busbar which contacts the conductive coating or the screen mesh of the face plate to make electrical contact to the enclosure bezel. The window is then typically bonded directly to the bezel using a conductive room temperature vulcanization adhesive or a conductive epoxy. When an adhesives such as these are used, several mounting clips are typically applied to the face plate to assure bonding. The manner in which the shielding is grounded to the bezel is also important in the production of effective shielding windows. One prior art method for grounding the face plate is to permanently bond the shielding screen to the enclosure by spot welding, brazing, soldering or elastomeric compression bond. In other applications, a conductive metallic or elastomeric gasket is mounted to the face plate in contact with the wire mesh screen or conductive coating. The primary function of this gasket is to minimize the EMI noise which is produced when the EMI currents in the mesh or conductive coating are returned to the system ground.

SUMMARY OF THE INVENTION

Accordingly, it is an object of the present invention to provide a cost effective means for providing EMI shielding to a VDU.

It is another object of this invention to provide an EMI shielded face plate which is simple and cost effective, and which provides effective grounding for the woven mesh or conductive coating.

It is another object of this invention to eliminate static electricity on the CRT viewing surface and the operator.

It is a still further object of this invention to enhance video image quality by providing a mechanical antiglare surface over the face of the VDU display surface which also provides electrical shielding.

Accordingly, one aspect of this invention comprises a conductive screen over the face of a cathode ray tube and a non-laminated transparent face plate between the bezel of the cathode ray tube housing and the face of the cathode ray tube, said face plate holding and electrically connecting the conductive screen to the conductive cabinet of the VDU.

Another aspect of this invention comprises placing a conductive screen over the face of a cathode ray tube, placing the face plate on the screen, folding the screen over the edge of the face plate, and electrically and mechanically securing the bezel of the cathode ray tube housing to the face plate.

Another aspect of the present invention comprises a transparent face plate between the bezel of a cathode ray tube housing and the face of the cathode ray tube, said face plate having a conductive material on its outer surface, and means between said bezel and said face plate extending 360° around the opening in the bezel, for holding said face plate and for electrically connecting said conductive material to said bezel.

Furthermore, the outermost surface of the face plate may have a non-flat textured surface to diffuse light and control glare.

DESCRIPTION OF THE PREFERRED EMBODIMENT

The Apparatus

Figure 1:
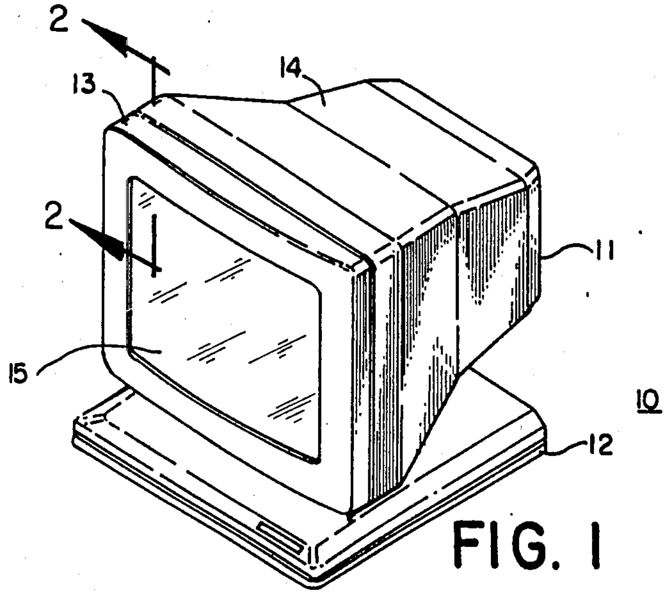
FIG. 1.is a perspective view of a video display unit made according to this invention.

FIG. 1 shows the video display unit, generally designated as 10, according to one embodiment of this invention. Monitor housing 11 is seen mounted to monitor base 12. Bezel 13 is mounted to the main portion 14 of housing 11. Face plate 15 covers the viewing surface of the cathode ray tube and is held in position by bezel 13.

Figure 2:
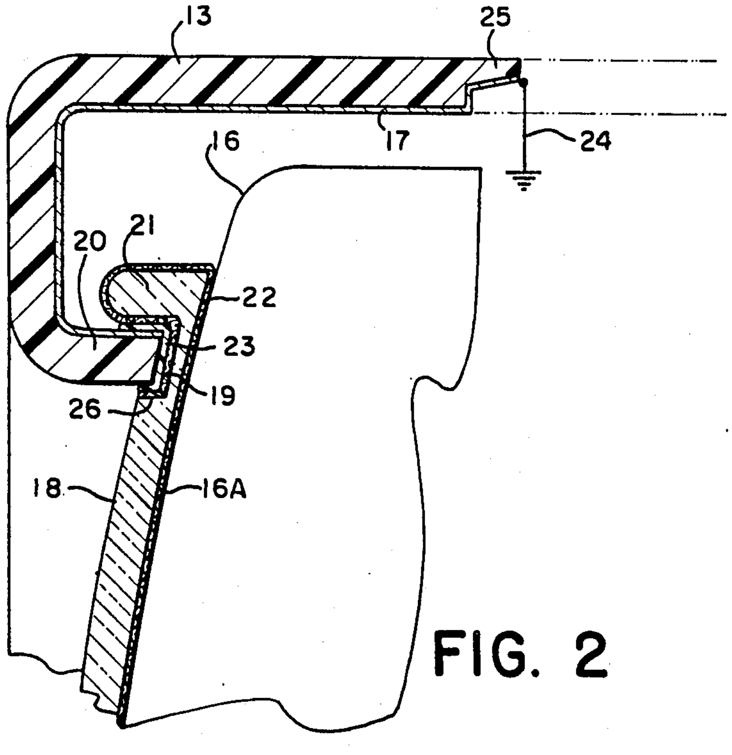
FIG. 2 is a cross sectional view substantially along the lines 2—2 FIG. 1 according to one embodiment of this invention.

Referring to FIG. 2, the details of the woven mesh EMI shielding for cathode ray tube 16 are shown. FIG.

2 shows the upper left hand corner of video display monitor 10 in a magnified view so that the details according to this embodiment are more clearly illustrated. According to one embodiment of this invention, the inner surface of bezel 13 is covered with a conductive coating 17. In the preferred embodiment of this invention, electrically conductive coating 17 is anyone of several well known electrically conductive paints applied to the inner surface of bezel 13.

As seen in FIG. 2, the face 16A of cathode ray tube 16 is covered by face plate 18. The face plate 18 is any material well known in the art suitable for viewing the image projected upon the display surface of CRT 16. For example, a transparent plastic face plate may be used. A grooved portion 19 of face plate 18 extends 360° around the periphery of face plate 18 and is sized to be slightly larger than the ridge portion 20 of bezel 13. In the preferred embodiment, ridge 20 extends 360° around the periphery of bezel 13. Groove 19 defines a first ledge 21 adjacent to the periphery of the face plate 18 and a second ledge 26 closer to the center of the face plate than the first ledge. Ridge 20 mates with groove 19 and grips conductive screen 22 so as to hold it in place. Conductive screen 22 is firmly held in conductive contact with the face 16A of CRT 16 by the back portion of face plate 18. In the preferred embodiment, conductive screen 22 is a woven wire mesh which readily allows passage of the image projected onto the face 16A of CRT 16 therethrough. In the most preferred embodiment, conductive screen 22 is a woven wire mesh comprising a matrix of small openings having a diameter of approximately one thousandth of inch. These openings are spaced such that there is approximately one hundred openings per linear inch or approximately ten thousand openings per square inch. Woven wire mesh of this configuration is available from Unique Wire Weaving Company of Hillside, N.J. The edge portion of conductive screen 22 wraps around ledge 21 of face plate 18 and is gripped in general by groove 19 and in particular by ledges 21 and 26. It will be appreciated by those skilled in the art that the interaction of groove 19 of face plate 18 and ridge 20 of bezel 13 constitute an advantageous feature of one embodiment of this invention. It will also be appreciated that the objectives of this invention may also be achieved by embodiments of this invention which do not utilize the groove/ridge mating. For example, the entire forward face of face plate 18 may be relatively flat, in which case conductive screen 22 simply folds over the edges of the face plate and is held in place by a relatively flat portion of bezel 13. Conductive adhesive may also be advantageously used in an embodiment such as this wherein adhesive is applied between face plate 18 and conductive screen 22; and/or between bezel 13 and conductive screen 22.

It is preferred that the layer of wire mesh 22 in the area of groove 19 between ledge 21 and ledge 26 of face plate 18 be mechanically trapped by ridge 20 of bezel 13. The conductive coating 17 of bezel 13 is in electrically conductive contact with screen 22 by this mechanical contact. In addition, a layer 23 of electrically conductive adhesive or glue may be located between the wire mesh 22 in groove 19 and ridge 20 of bezel 13. Thus, ledges 21 and 22 not only serve to stabilize ridge 20 within groove 19, but also to retain the glue within the groove. In addition glue layer 23 not only serves to insure that conductive screen 22 is firmly gripped to face plate 18 and to bezel 13, but also that high quality electrically conductive contact is maintained between conductive screen 22 and conductive coating 17 on the inside surface of bezel 13. In the preferred embodiment of this invention conductive adhesive is utilized. It is also possible to eliminate the need for adhesive by increasing the integrity of the mechanical fit between the face plate 18 and the bezel 13.

Figure 3:
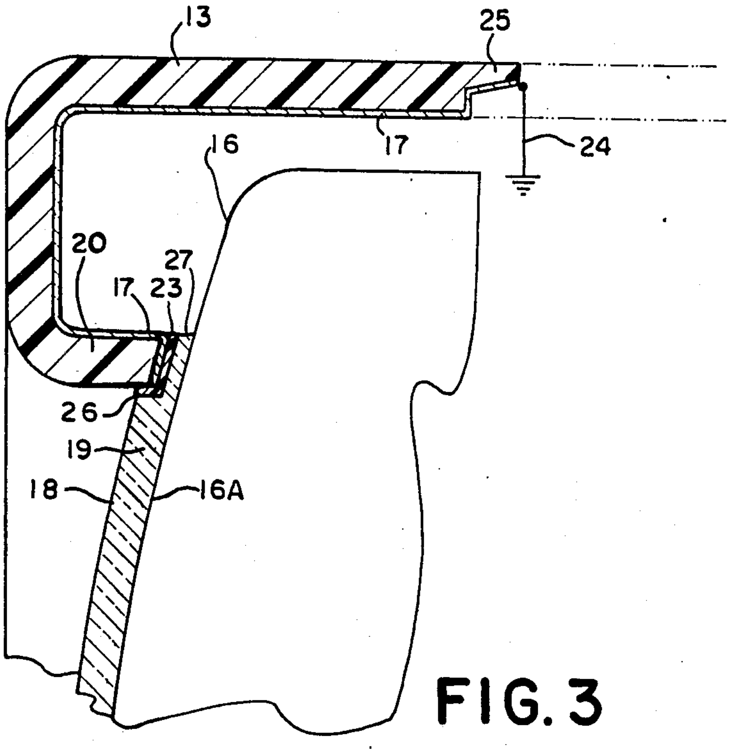
FIG. 3 is a cross sectional view substantially along the lines 2—2 FIG. 1 according to another embodiment of this invention.

Referring now to FIG. 3, another embodiment of the present invention is disclosed. In this embodiment, the face plate 18 is modified by eliminating the peripheral ledge 21 shown in FIG. 2. The wire mesh 22 is also removed and replace by a conductive coating 22A on the forward surface of the face plate. In the preferred embodiment of this invention, the conductive coating 22A is a thin transparent conductive coating deposited upon the outer surface of face plate 18 by, for example, well known vapor deposition techniques. In this way conductive coating 22A can be of such a thickness as to be essentially transparent. A stepped portion 27 of reduced thickness extends 360° around the periphery of the face plate 18. In this embodiment ledge 26 and stepped portion 27 provide a surface upon which ridge 20 of bezel 13 mates. The mating of ridge 20 with stepped portion 27 and ledge 26 provides mechanical stability for the face plate 18. In addition, since the inner surface of the bezel 13 is coated with the conductive coating 17 and the outer surface of the face plate 18 is coated with the conductive coating 22A, mating of the bezel with the face plate provides the means for grounding the face plate to the enclosure. In the preferred embodiment, a layer 23 of electrically conductive adhesive or glue is located between ridge 20 and stepped portion 27 and between ridge 20 and ledge 26 as a means for aiding the mechanical stability of the face plate 18. In addition, conductive contact between conductive coating 22A and conductive coating 17 is enhanced by the conductive glue as disclosed above.

It will appreciated by those skilled in the art that a video display unit configured according to one of the embodiments described above provides a cost effective means for preventing the build up of static electricity on the surface of cathode ray tube 16. In particular, any electrostatic charge which builds up on the face 16A of cathode ray tube 16 is conducted through the conductive screen or the conductive coating. This charge then passes to conductive coating 17. As indicated by the GROUND symbol marked 24 in FIG. 2, conductive coating 17 is grounded according to any means well known in the art. For example, in many applications the interior of the main portion 14 of housing 11 is coated with a coating similar to conductive coating 17. When bezel 13 is mounted to the main portion 14 of housing 11, the coating 17 on rear ledge 25 will contact the coating on the interior of main housing 14. The coating on the interior of main housing 14 will in turn be grounded according to any means well known in the art. In this way, any excess electrons which build up on the surface 16A of cathode ray tube 16 will be conducted to ground as described above. In one embodiment of this invention, a plastic injection molding process for manufacturing face plate 18 is used. It has been discovered that the molding tool used in this process can be configured so as to advantageously impart a texture to the surface of face plate 18. By molding face plate 18 with a texture surface comprising consistent irregularities, an anti-glare EMI shield is economically produced. In a preferred embodiment, the irregularities may comprise shallow pockmarks one to two thousandth of an inch deep.

The Method

Figure 4:
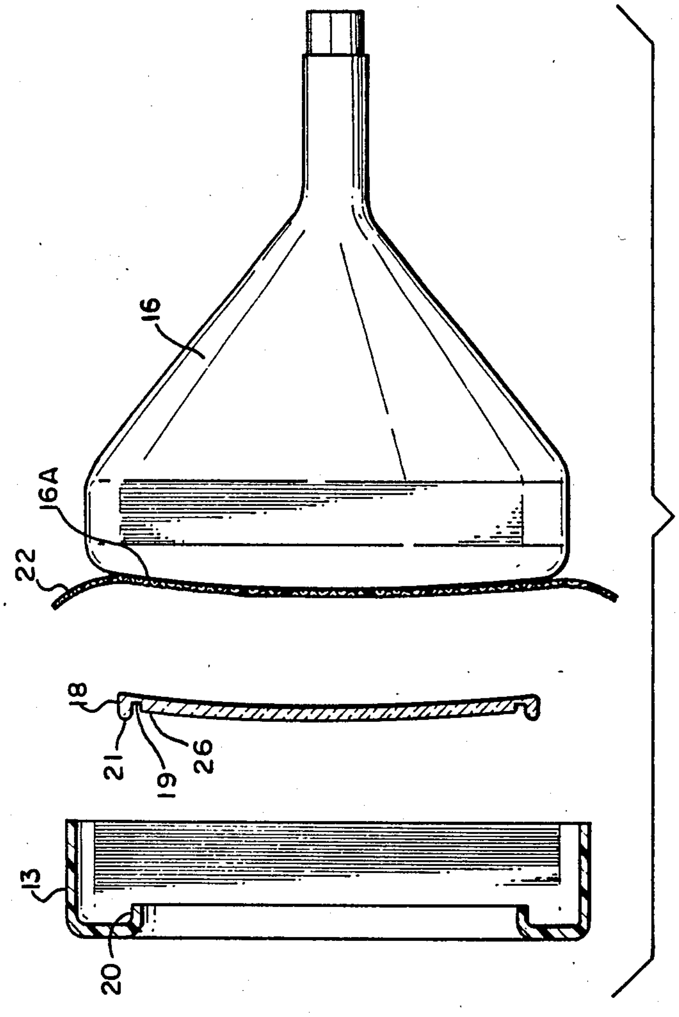
FIG. 4 an exploded elevation view showing the CRT, mesh screen, face plate, and bezel in a pre-assembly position according to a method of this inventions.

Referring now to FIG. 4, the method for providing an EMI shielded cathode ray tube according to one embodiment of this invention is disclosed. A conductive screen 22 is provided which has a larger extent than the viewing area of cathode ray tube 16. Conductive screen 22 is then placed firmly and tautly over the viewing surface of cathode ray tube 16. It is desirable to insure that no impurities or dust particles exist between conductive screen 22 and cathode ray tube 16. With conductive screen 22 stretched into intimate contact with the viewing surface 16A of cathode ray tube 16, face plate 18 is placed or pressed into intimate contact with the outer surface of conductive screen 22. It is preferred that the conductive screen 22 is then folded over the ends of face plate 18, around ledge 21, and into groove 19. In one embodiment of this invention, conductive adhesive or glue is applied to that portion of conductive screen 22 which is contained within groove 19, as shown in FIG. 2. Bezel 13 is then moved over face plate 18 and holds the folded-over portion of screen 22 against the forward facing portion of face plate 18. Ridge 20 of bezel 13 mates with groove 19 and holds or grips the folded over portion of screen 22 thereto.

Referring once again to FIG. 3, the method of the present invention used to produce the embodiment disclosed in connection therewith will now be described. This method comprises the step of providing a transparent face plate 18 having a reduced thickness stepped portion 27 extending 360° around the periphery of the face plate, said face plate having a thin layer of conductive coating 22A on its outer surface. A further step according to the present invention comprises providing a bezel member 13 having an inward facing ridge 20 adapted to mate with the stepped portion 27 of the face plate 18. The interior surface of bezel 13, including the ridge portion 20, is coated with the conductive coating 17. The face plate 18 is then mated with the bezel 13 such that ridge 20 engages ledge 26 and the stepped portion 27. Once the face plate 18 is mated to the bezel 13 as described above, the method may optionally include mechanically stabilizing the face plate by contacting the rearward portion of the face plate 18 with the forward portion of CRT 16. A further optional step comprises adding a layer of conductive adhesive between ridge 20 and stepped portion 27 prior to the mating step.

Although particular embodiments of this invention have been described in detail for purposes of illustration, it will appreciated that various modifications are within the spirit and scope of this invention. The appended claims are intended to cover such modifications.

What is claimed is:

1. In a video display unit of the type including a cathode ray tube and a housing for the cathode ray tube having a bezel with an opening for viewing the face of the cathode ray tube, the improvement comprising:
   (a) a face plate through which the face of said cathode ray tube can be viewed;
   (b) means located around the periphery of said face plate for conducting electricity from said face plate, including a stepped portion of said face plate around the periphery of said face plate; and
   (c) means between the bezel and said face plate extending around 360° of the opening in the bezel for holding said face plate and for electrically connecting said face plate to the bezel, said means including the bezel having a ridge which engages the stepped portion of said face plate.

2. The improved video display unit recited in claim 1 wherein said means for conducting comprises a conductive coating on said face plate.

3. The improved video display unit recited in claim 2 wherein said conductive coating is on the forward surface of said face plate.

4. The improved video display unit of claim 1 wherein said means for holding further comprises conductive adhesive between said stepped portion of said face plate and said ridge.

5. The improved video display unit of claim 4 wherein the rearward surface of said face plate is held in contact with the face of said cathode ray tube by said bezel.

* * * * *